(12) United States Patent
Lee et al.

(10) Patent No.: US 6,961,200 B2
(45) Date of Patent: Nov. 1, 2005

(54) OPTICAL SERVO TRACK IDENTIFICATION ON TAPE STORAGE MEDIA

(75) Inventors: Tzuochang Lee, Shrewsbury, MA (US); Hong Chen, Shrewsbury, MA (US); Peiqian Zhao, Palo Alto, CA (US)

(73) Assignee: Quantum Corporation, San Jose, CA (US)

( * ) Notice: Subject to any disclaimer, the term of this patent is extended or adjusted under 35 U.S.C. 154(b) by 276 days.

(21) Appl. No.: 10/140,098

(22) Filed: May 7, 2002

(65) Prior Publication Data

US 2002/0167751 A1 Nov. 14, 2002

Related U.S. Application Data

(63) Continuation-in-part of application No. 09/361,669, filed on Jul. 27, 1999.

(51) Int. Cl.$^7$ ................ G11B 15/18; G11B 5/584; G11B 21/02
(52) U.S. Cl. ............. 360/72.1; 360/75; 360/77.03; 360/77.12
(58) Field of Search .............. 360/71, 75, 77.03, 360/77.12, 72.1, 78.02; 427/127, 555; 216/22, 216/65; 369/4.37–4.38, 112.04, 112.05, 112.03, 369/112.06, 112.07, 112.11, 112.12, 44.23

(56) References Cited

U.S. PATENT DOCUMENTS

| | | | |
|---|---|---|---|
| 2,923,781 A | 2/1960 | Gordon et al. | |
| 3,404,392 A | 10/1968 | Sordello | |
| 3,426,337 A | 2/1969 | Black et al. | |
| 3,637,991 A | 1/1972 | Yanagawa | |
| 3,662,120 A | 5/1972 | Hess | |
| 3,739,362 A * | 6/1973 | Eschelbach | ............ 360/114.05 |
| 3,768,752 A | 10/1973 | Bettini et al. | |
| 3,790,755 A | 2/1974 | Silverman | |
| 3,838,291 A | 9/1974 | Marion et al. | |
| 3,914,793 A | 10/1975 | Burnham | |
| 3,916,039 A | 10/1975 | Akashi et al. | |
| 3,980,480 A | 9/1976 | Lairidon et al. | |
| 4,008,085 A | 2/1977 | Lemahieu et al. | |
| 4,123,788 A | 10/1978 | Kruger | |
| 4,176,381 A | 11/1979 | de Niet et al. | |
| 4,275,425 A | 6/1981 | Watanabe et al. | |
| 4,313,143 A | 1/1982 | Zarr | |

(Continued)

FOREIGN PATENT DOCUMENTS

CH 586 944 4/1977

(Continued)

OTHER PUBLICATIONS

European Search Report mailed on Aug. 22, 2003, for European Patent Application No. 03252726.9 filed on Apr. 30, 2003, and published on Nov. 12, 2003 as European Publication No. 1 361 568, 3 pages.

*Primary Examiner*—David Hudspeth
*Assistant Examiner*—Jason Olson
(74) *Attorney, Agent, or Firm*—Morrison & Foerster LLP

(57) ABSTRACT

A method and a system for formatting a magnetic tape with identifiable optical servo tracks are disclosed. Multiple optically detectable servo tracks extending lengthwise parallel to the tape transport direction are written simultaneously by directing a spatial beam dot pattern unto the magnetic tape. The beam dot pattern is capable of imparting not only a unique identification, but also other information such as tape longitudinal address, and manufacturer's data to each servo track. The spatial beam dot pattern may also include two arrays of beam dots created via the use of two one-dimensional diffractive optical elements.

40 Claims, 15 Drawing Sheets

U.S. PATENT DOCUMENTS

| | | | |
|---|---|---|---|
| 4,315,283 A | 2/1982 | Kinjo et al. |
| 4,340,305 A | 7/1982 | Smith et al. |
| 4,371,904 A | 2/1983 | Brooke |
| 4,380,032 A | 4/1983 | Pfost |
| 4,422,111 A | 12/1983 | Moeller et al. |
| 4,558,383 A | 12/1985 | Johnson |
| 4,570,191 A | 2/1986 | Di Stefano et al. |
| 4,578,311 A | 3/1986 | Ishikuro et al. |
| 4,626,469 A | 12/1986 | Yamaguchi et al. |
| 4,633,451 A | 12/1986 | Ahn et al. |
| 4,679,104 A | 7/1987 | Dahlerud |
| 4,737,877 A | 4/1988 | Krongelb et al. |
| 4,746,542 A | 5/1988 | Chino et al. |
| 4,750,067 A | 6/1988 | Gerfast |
| 4,802,030 A | 1/1989 | Henry et al. |
| 4,816,939 A | 3/1989 | Ford et al. |
| 4,816,941 A | 3/1989 | Edel et al. |
| 4,843,494 A | 6/1989 | Cronin et al. |
| 4,848,698 A | 7/1989 | Newell et al. |
| 4,868,046 A | 9/1989 | Moriizumi et al. |
| 4,876,886 A | 10/1989 | Bible et al. |
| 4,884,260 A | 11/1989 | Bouldin et al. |
| 4,935,835 A | 6/1990 | Godwin et al. |
| 4,937,810 A | 6/1990 | Drexler et al. |
| 4,958,245 A | 9/1990 | Roth et al. |
| 4,961,123 A | 10/1990 | Williams et al. |
| 4,969,058 A | 11/1990 | Williams et al. |
| 4,983,496 A | 1/1991 | Newell et al. |
| 5,008,765 A | 4/1991 | Youngquist |
| 5,016,240 A | 5/1991 | Strandjord et al. |
| 5,038,030 A | 8/1991 | Hayashi et al. |
| 5,050,017 A | 9/1991 | Carr et al. |
| 5,065,387 A | 11/1991 | Roth et al. |
| 5,067,039 A | 11/1991 | Godwin et al. |
| 5,097,351 A | 3/1992 | Kramer |
| 5,105,322 A | 4/1992 | Steltzer |
| 5,120,927 A | 6/1992 | Williams et al. |
| 5,121,371 A | 6/1992 | Farnsworth et al. |
| 5,163,032 A | 11/1992 | Van Nieuwland et al. |
| 5,179,463 A | 1/1993 | Kramer |
| 5,196,297 A | 3/1993 | Dombrowski et al. |
| 5,196,969 A | 3/1993 | Iwamatsu et al. |
| 5,210,672 A | 5/1993 | Ivers et al. |
| 5,229,620 A | 7/1993 | Pahr |
| 5,262,908 A | 11/1993 | Iwamatsu et al. |
| 5,279,775 A | 1/1994 | Thomas et al. |
| 5,280,402 A | 1/1994 | Anderson et al. |
| 5,283,773 A | 2/1994 | Thomas et al. |
| 5,311,378 A | 5/1994 | Williams et al. |
| 5,319,507 A | 6/1994 | Umebayashi et al. |
| 5,322,987 A | 6/1994 | Thomas et al. |
| 5,333,091 A | 7/1994 | Iggulden et al. |
| 5,349,484 A | 9/1994 | Koehler |
| 5,363,255 A | 11/1994 | Ivers et al. |
| 5,369,631 A | 11/1994 | Hwang |
| 5,371,636 A | 12/1994 | Nayak et al. |
| 5,379,170 A | 1/1995 | Schwarz |
| 5,379,283 A | 1/1995 | Miyajima |
| 5,414,578 A | 5/1995 | Lian et al. |
| 5,414,585 A | 5/1995 | Saliba |
| 5,432,652 A | 7/1995 | Comeaux et al. |
| 5,448,430 A | 9/1995 | Bailey et al. |
| 5,450,257 A | 9/1995 | Tran et al. |
| 5,452,152 A | 9/1995 | Rudi |
| 5,457,586 A | 10/1995 | Solhjell |
| 5,462,823 A | 10/1995 | Evans et al. |
| 5,510,140 A | 4/1996 | Kurose et al. |
| 5,515,212 A | 5/1996 | Chiao et al. |
| 5,518,804 A | 5/1996 | Mizuno et al. |
| 5,523,904 A | 6/1996 | Saliba |
| 5,532,042 A | 7/1996 | Kawarai et al. |
| 5,535,069 A | 7/1996 | Chiao et al. |
| 5,563,868 A | 10/1996 | Farnsworth et al. |
| 5,566,033 A | 10/1996 | Frame et al. |
| 5,589,247 A | 12/1996 | Wallack et al. |
| 5,615,205 A | 3/1997 | Belser |
| 5,661,616 A | 8/1997 | Tran et al. |
| 5,661,823 A | 8/1997 | Yamauchi et al. |
| 5,674,583 A | 10/1997 | Nakayama et al. |
| 5,675,448 A | 10/1997 | Molstad et al. |
| 5,677,806 A | 10/1997 | Eckberg et al. |
| 5,680,278 A | 10/1997 | Sawtelle, Jr. |
| 5,689,384 A | 11/1997 | Albrecht et al. |
| 5,705,268 A | 1/1998 | Ishikawa et al. |
| 5,718,964 A | 2/1998 | Naoe et al. |
| 5,726,834 A | 3/1998 | Eckberg et al. |
| 5,815,482 A | 9/1998 | Rope et al. |
| 5,877,910 A | 3/1999 | Williams et al. |
| 6,005,667 A * | 12/1999 | Takamiya et al. ............ 356/499 |
| 6,084,740 A | 7/2000 | Leonhardt et al. |
| 6,236,529 B1 | 5/2001 | Leonhardt et al. |
| 6,246,535 B1 * | 6/2001 | Saliba et al. .............. 360/77.12 |
| 6,365,061 B1 * | 4/2002 | Damer et al. .................. 216/65 |
| 6,433,951 B1 * | 8/2002 | Lubratt ..................... 360/77.12 |
| 6,459,659 B1 * | 10/2002 | Jhe et al. ................. 369/44.11 |
| 6,493,174 B1 * | 12/2002 | Stubbs .................... 360/77.12 |
| 6,558,774 B1 * | 5/2003 | Saliba et al. ................. 428/156 |
| 6,563,662 B2 * | 5/2003 | Smith ...................... 360/77.03 |

FOREIGN PATENT DOCUMENTS

| | | |
|---|---|---|
| DE | 24 06 292 | 8/1975 |
| DE | 26 16 362 | 11/1977 |
| DE | 32 01 935 | 8/1983 |
| DE | 34 17 426 | 11/1985 |
| DE | 41 42 052 | 7/1992 |
| EP | 0 069 548 | 1/1983 |
| EP | 0 083 753 | 7/1983 |
| EP | 0 097 774 | 1/1984 |
| EP | 0 108 258 | 5/1984 |
| EP | 0 119 568 | 9/1984 |
| EP | 0 130 495 | 1/1985 |
| EP | 0 155 000 | 9/1985 |
| EP | 0 16 199 | 1/1986 |
| EP | 0 177 737 | 4/1986 |
| EP | 0 180 258 | 5/1986 |
| EP | 0 189 948 | 8/1986 |
| EP | 0 244 005 | 11/1987 |
| EP | 0 257 713 | 3/1988 |
| EP | 0 311 485 | 4/1989 |
| EP | 0 311 859 | 4/1989 |
| EP | 0 336 419 | 10/1989 |
| EP | 0 344 759 | 12/1989 |
| EP | 0 347 074 | 12/1989 |
| EP | 0 351 837 | 1/1990 |
| EP | 0 353 007 | 1/1990 |
| EP | 0 368 268 | 5/1990 |
| EP | 0 368 269 | 5/1990 |
| EP | 0 390 555 | 10/1990 |
| EP | 0 423 662 | 4/1991 |
| EP | 0 434 230 | 6/1991 |
| EP | 0 443 810 | 8/1991 |
| EP | 0 535 112 | 12/1991 |
| EP | 0 484 774 | 5/1992 |
| EP | 0 484 775 | 5/1992 |
| EP | 0 484 779 | 5/1992 |
| EP | 0 484 780 | 5/1992 |
| EP | 0 496 132 | 7/1992 |
| EP | 0 496 461 | 7/1992 |
| EP | 0 549 845 | 7/1993 |
| EP | 0 549 854 | 7/1993 |
| EP | 0 555 511 | 8/1993 |
| EP | 0 564 187 | 10/1993 |
| EP | 0 645 043 | 12/1993 |

| | | | | | | |
|---|---|---|---|---|---|---|
| EP | 0 645 044 | 12/1993 | | JP | 5-073883 | 3/1993 |
| EP | 0655 960 | 12/1993 | | JP | 6-020414 | 1/1994 |
| EP | 0 598 503 | 5/1994 | | JP | 6-139549 | 5/1994 |
| EP | 0 606 710 | 7/1994 | | JP | 6-243619 | 9/1994 |
| EP | 0 684 597 | 11/1995 | | JP | 6-259736 | 9/1994 |
| EP | 1 205 912 | 5/2002 | | JP | 7-029136 | 1/1995 |
| EP | 1 205 913 | 5/2002 | | JP | 7-057412 | 3/1995 |
| FR | 2 315 142 | 1/1997 | | JP | 7-065434 | 3/1995 |
| GB | 2 008 290 | 5/1979 | | JP | 7-220255 | 8/1995 |
| GB | 1 595 136 | 8/1981 | | JP | 7-082626 | 9/1995 |
| GB | 2 121 227 | 12/1983 | | JP | 8-174669 | 7/1996 |
| JP | 56-111169 | 9/1981 | | JP | 9-007131 | 1/1997 |
| JP | 57-050346 | 3/1982 | | JP | 9-033773 | 2/1997 |
| JP | 57-120230 | 7/1982 | | JP | 9-035246 | 2/1997 |
| JP | 57-120255 | 7/1982 | | JP | 9-265626 | 10/1997 |
| JP | 61-142530 | 6/1986 | | JP | 9-289885 | 11/1997 |
| JP | 61-293372 | 12/1986 | | JP | 9-289973 | 11/1997 |
| JP | 62-192025 | 8/1987 | | JP | 9-297914 | 11/1997 |
| JP | 63-148416 | 6/1988 | | JP | 9-320197 | 12/1997 |
| JP | 63-251924 | 10/1988 | | JP | 10-043924 | 2/1998 |
| JP | 64-070916 | 3/1989 | | KR | 9406847 | 7/1994 |
| JP | 2-169915 | 6/1990 | | SU | 1137513 | 1/1985 |
| JP | 3-094881 | 4/1991 | | WO | WO 83/01858 | 5/1983 |
| JP | 3-141087 | 6/1991 | | WO | WO 85/02933 | 7/1985 |
| JP | 3-201215 | 9/1991 | | WO | WO 85/03376 | 8/1985 |
| JP | 3-219432 | 9/1991 | | WO | WO 88/02168 | 3/1988 |
| JP | 3-242816 | 10/1991 | | WO | WO 94/12975 | 6/1994 |
| JP | 4-003832 | 1/1992 | | WO | WO 00/49604 | 8/2000 |
| JP | 4-038632 | 2/1992 | | WO | WO 00/49605 | 8/2000 |
| JP | 4-059399 | 2/1992 | | | | |
| JP | 4-252417 | 9/1992 | | * cited by examiner | | |
| JP | 4-305844 | 10/1992 | | | | |

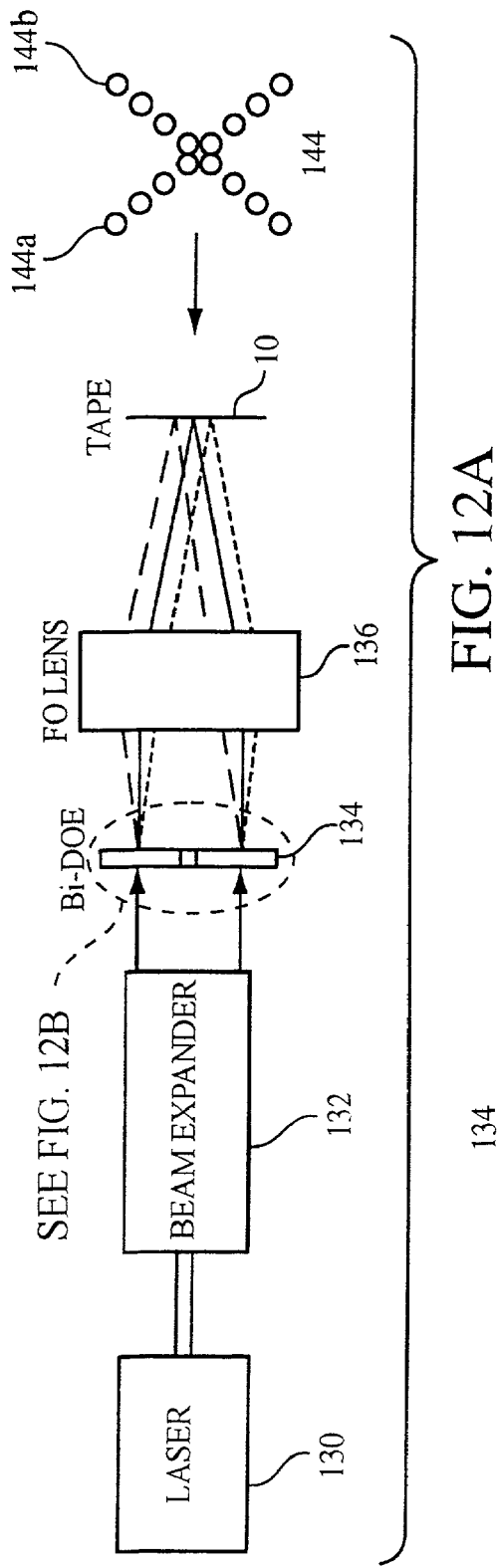
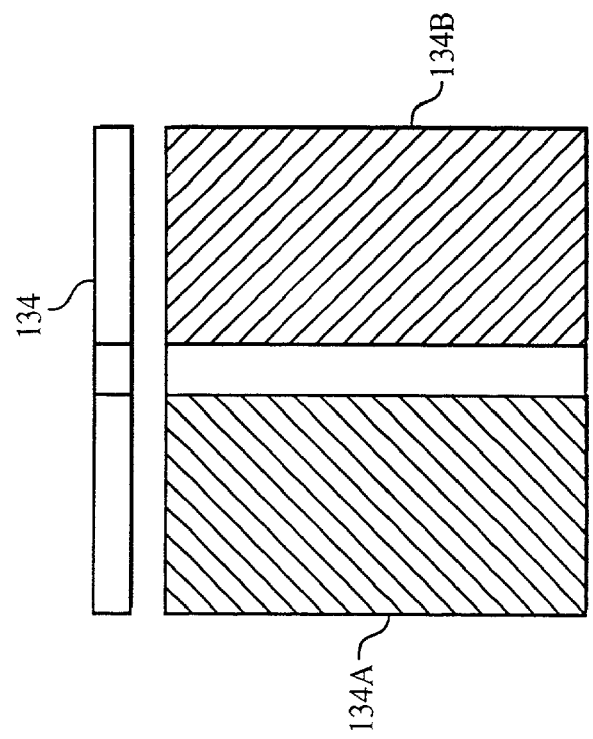
FIG. 12A
FIG. 12B

US 6,961,200 B2

OPTICAL SERVO TRACK IDENTIFICATION ON TAPE STORAGE MEDIA

CROSS-REFERENCE TO RELATED APPLICATIONS

This application is a continuation-in-part of U.S. patent application Ser. No. 09/361,669 to Hong Chen et al., filed Jul. 27, 1999, and assigned to the same assignee as the present application.

TECHNICAL FIELD

This invention relates to optical servo track identification on tape storage media.

BACKGROUND

Digital magnetic tape recording provides an important function of data backup in a hierarchy of data storage platforms. Conventionally, at least two approaches are employed for recording digital information onto magnetic recording tape. One approach calls for moving the tape past a rotating head structure that records and plays back user information from discontinuous transverse tracks. Interactive servo systems are employed to synchronize rotation of the head structure with travel of the tape. Another approach is to draw the tape across a non-rotating head at a considerable linear velocity. This approach is sometimes referred to as digital linear tape (DLT) recording and playback.

Increased data storage capacity and retrieval performance is being required of all commercially viable mass storage devices and media. In the case of digital linear tape recording, a trend is toward multi-head, multi-channel fixed head structures with narrowed recording gaps and track widths. Such narrow recording heads allow many linear tracks to be formed on a magnetic tape of predetermined width, such as one-half inch width tape. Tape substrates are also being made thinner, with increased tape lengths being made possible in small diameter reel packages.

SUMMARY

In an aspect, the invention features an optical servo system including a laser source for generating a single beam of light, a diffractive optical element (DOE) positioned to receive and split the single beam into a linear array of beams, a lens to focus the linear array of beams to form a spatially separated array of beam dots, and a spatial light modulator (SLM) positioned to receive and selectively filter the linear array of beam dots to form a time dependent spatial pattern.

One or more of the following features may also be included. The system may also include lenses positioned to image the filtered beam dots onto a moving magnetic tape to cause a time dependent etched pattern on the tape, each one of the dots corresponding to one of a plurality of servo tracks. A second DOE may be positioned prior to a final focusing lens so that the tracks are simultaneously duplicated into multiple copies across a width of the moving tape. The filtered beam dots may form and etch a pattern on a non-magnetic surface of the moving magnetic tape or on a magnetic surface of the moving magnetic tape. The pattern may indicate track identification, a position along the tape, manufacturer's data, and control information for each of the plurality of servo tracks on the magnetic tape.

In another aspect, the invention features a method of generating a pattern on a magnetic tape including generating a single beam of coherent light, splitting the single beam in a diffractive optical element (DOE) into a linear array of beams, focusing the beams to form an array of spatially separated beam dots, and filtering the plurality of beam dots in a spatial light modulator (SLM).

One or more of the following features may also be included. The method may also include positioning lenses to image the filtered beam dots on a moving magnetic recording tape with lenses, the dots forming a time dependent etched pattern on the tape. The method may also include etching the filtered beam dots on a non-magnetic surface of the moving magnetic recording tape or etching the filtered beam dots on a magnetic surface of the moving magnetic recording tape. The pattern may indicate track identification, position along the tape, control information, and manufacturer's data for each of a plurality of servo tracks on the magnetic recording tape.

In another aspect, the invention features an optical servo writer system including a laser source for generating a single beam of light, a diffractive optical element (DOE) positioned to receive and split the single beam into a two dimensional array of beams, a lens to focus the two dimensional array of beams to form a two dimensional array of spatially separated beam dots, and a spatial light modulator (SLM) positioned to receive and selectively filter the two dimensional array of beam dots.

One or more of the following features may be included. The system may include lenses positioned to image the selectively filtered beam dots onto a moving magnetic tape, the dots forming a time dependent etched pattern on the tape. The system may include a second DOE positioned prior to a final focusing lens such that tracks are duplicated into multiple copies across a width of the moving magnetic tape. The SLM may be an active spatial modulator in which each individual cell of the SLM can be selectively turned on and off to allow passage or blockage of light or a passive spatial filter in which a filtered pattern is a pre-determined fixed spatial pattern. Selectively filtered beam dots may form and etch the pattern on a non-magnetic surface of the magnetic tape or on a magnetic surface of the magnetic tape. The pattern may indicate track identification, position along the tape, control information, and manufacturer's data for each of a plurality of data tracks on a recording surface of the magnetic tape.

In another aspect, the invention features a method of generating a pattern on a magnetic tape including generating a single beam of coherent light, splitting the single beam in a diffractive optical element (DOE) into a two dimensional array of beams, focusing the two dimensional array of beams by a lens to form a two dimensional array of spatially separated beam dots, and spatially filtering the plurality of beams dots with a spatial light modulator (SLM).

One or more of the following features may be included. The method may include imaging the spatially filtered beam dots on a moving magnetic tape with lenses. A second DOE may be positioned prior to a final focusing lens such that tracks are duplicated into multiple copies across a width of the moving tape. The spatially filtered beam dots may form and etch a pattern on a non-magnetic surface of the magnetic tape or on a non-magnetic surface of the magnetic tape.

In another aspect, the invention features a system including a laser source for generating a single beam of light, a passive optical element to split the beam into two beams with an angle separation, and a bi-DOE having two DOEs etched into a single glass substrate, each DOE having different angle orientations for a diffracted array of beams.

One or more of the following features may also be included. The system may also include a lens positioned to receive and focus the two beams to generate a pattern having two linear arrays of dots forming a small angle with respect to each other on a moving magnetic tape. The passive optical element may be a Wollaston prism or an optical wedge. The two DOEs may be one-dimensional, each producing a one-dimensional array of beams. A third DOE may be positioned prior to a final focusing lens such that tracks are duplicated into multiple copies across a width of the moving tape. The two beams may form and etch a pattern on a non-magnetic surface of the magnetic tape or on a magnetic surface of the magnetic tape. The pattern may indicate track identification for each of a plurality of servo tracks on the magnetic tape.

In another aspect, the invention features a system including a laser source for generating a single beam of light, a half-wave-plate in combination with a polarizing beam splitter positioned to receive and split the single beam into two beams, an optical wedge positioned in a first beam to impart a small angle deviation to one of the tow beams, a set of mirrors to direct a second beam such that the first beam and second beam can be recombined, a first DOE positioned to split the first beam into a first linear array of beams, a second DOE positioned to split the second beam into a second linear array of beams, and a second polarizing beam splitter positioned to receive and recombine the first and second array of beams.

One or more of the following features may also be included. The system may include a lens positioned to receive and focus the recombined array of beams to generate a repeated pattern having two linear arrays of dots forming an angle with respect to each other on to a moving magnetic tape. The system may also include a third DOE positioned prior to a final focusing lens such that tracks are duplicated into multiple copies across the moving tape. The first beams and the second beams may form and etch a pattern on a non-magnetic surface of the magnetic tape or on a magnetic surface of the magnetic tape. The pattern may indicate track identification for each of a plurality of servo tracks on the magnetic tape.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 12A is a simple system for generating passive servo patterns using a bi-DOE.

FIG. 12B shows a composition of the bi-DOE of FIG. 12A.

DETAILED DESCRIPTION

Figure 1:
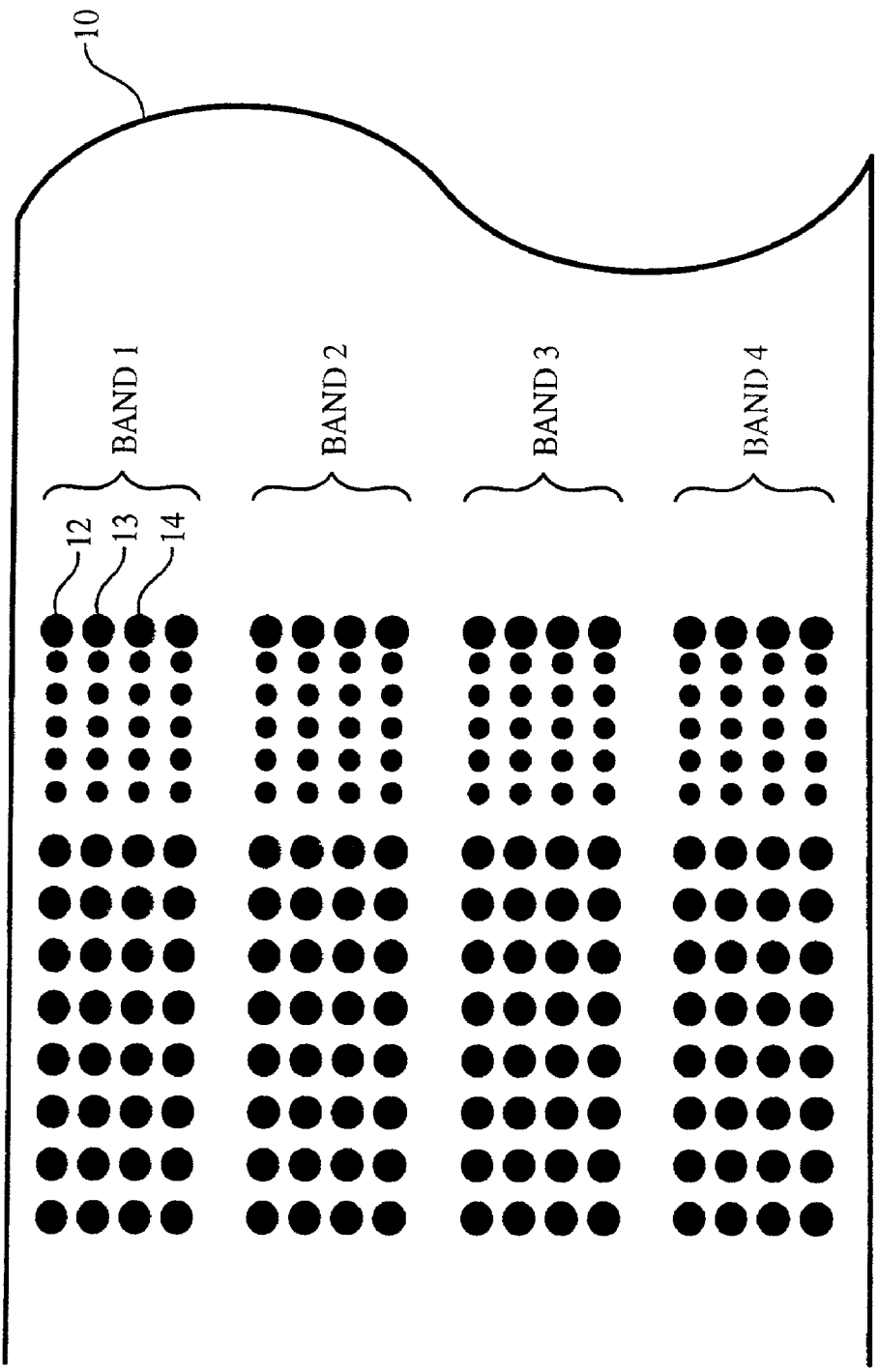
FIG. 1 indicates several bands of servo tracks recorded on a magnetic tape.

FIG. 1 shows an example of a servo track. A magnetic tape 10 is provided with several servo bands (labeled Band 1, Band 2, Band 3, and Band 4), wherein each servo band may include a servo track pattern composed of a plurality of servo tracks 12, 13, 14, each of the servo tracks 12, 13, 14 can be engraved onto the magnetic tape 10 by a marking mechanism. The servo marks are typically spaced apart a uniform distance. The servo tracks can also be continuous lines instead of being discrete marks. The servo tracks can be read with an optical pickup device. A servo band may include servo tracks on a non-magnetic surface of the tape 10, and each servo track may correspond to multiple data tracks on the magnetic side of the magnetic tape 10. The many-to-one correspondence relies on the use of a multiple channel magnetic recording head (not shown).

The servo tracks 12, 13, 14 extend the full length of the magnetic tape 10. These servo tracks 12, 13, 14 are employed for aligning recording heads (not shown) with a data track recorded on to an opposite (i.e., magnetic) side of the magnetic tape 10. The servo tracks 12, 13, 14, provide for precise alignment of a recording head with a data track regardless of LTM during the recording of data as the tape 10 moves across the recording head. Thus, more data tracks can be packed on the magnetic side of the tape 10, thereby increasing total data storage capacity for the tape 10. The number of servo tracks 12, 13, 14, that are marked onto a tape 10 depends, in part, on the size of the servo mark, the pitch between servo marks, and the pitch between servo tracks.

When a servo feedback loop (not shown) is employed, an actuator by which a combined optical pick up device and magnetic recording head are driven will move up and down according to the tape lateral motion. However, due to the existence of tape defects, and unexpected shocks and vibrations of a tape drive, the servo feedback loop may become disrupted, and opened. Under such a circumstance the servo feedback loop can be closed again when the upset event is passed. But the servo feedback loop will not know which track is acquired since there is no distinction among the various tracks. One has to make the actuator mechanism go to the bottom or the top of the tape 10 and seek by counting the tracks until the desired track is reached. This compromises the drive performance and runs the risk of incorrect counting unless numerous protective algorithms are provided.

Although marking mechanisms can adjust the spatial characteristics of the generated servo patterns, the servo tracks themselves do not carry track information for determining their lateral position on the tape. The systems and methods described herein provide track information, such as track identification, manufacturer ID, manufacturer's data, longitudinal addresses, and/or control information.

Figure 2:
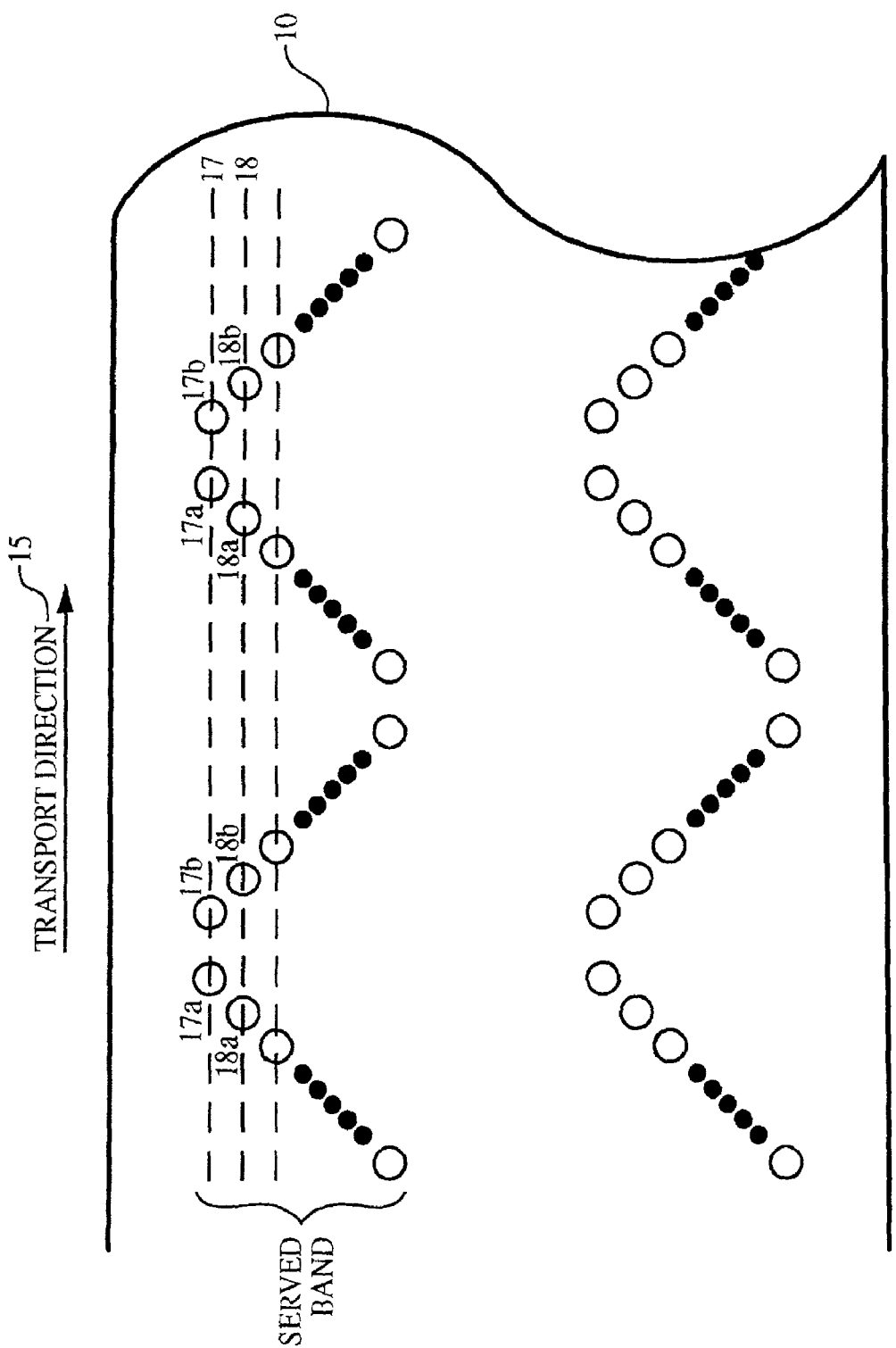
FIG. 2 is a first example of a V-like servo track pattern.

Referring to FIG. 2, one servo band is shown having an exemplary V-shaped track pattern repeated along the tape 10. The track pattern is formed by alternatingly and/or sequentially engraving the tape 10 in a manner to be described below. The spacing and orientation of track marks 17a, 17b, 18a, 18b can be adjusted. With the tape 10 moving in a transport direction 15, an optical servo head (not shown) reading the track marks 17a, 17b along servo track 17 will encounter two closely spaced track marks 17a–17b, followed by a larger spacing, 17b–17a. The optical servo head, when reading the track marks 18a, 18b along servo track 18 will also encounter two closely spaced track marks 18a–18b followed by a larger spacing 18b–18a. However, the spacing between the track marks 18a–18b is greater than the spacing between the track marks 17a–17b, while the spacing between the track marks 18b–18a is smaller than the spacing 17b–17a. The track marks can be written on the tape 10 so that each track has a unique combination of a small and a large spacing. In so doing, the spacing is converted by the moving tape 10 into timing signals that can be detected by the optical servo head, thereby uniquely identifying the respective track.

In the case of identification ambiguity for the upper tracks versus the lower tracks in a given servo band due to inversion symmetry with respect to the middle of the servo band, the optical servo head can simultaneously read signals from servo marks located on the adjacent tracks to remove the ambiguity.

Figure 3:
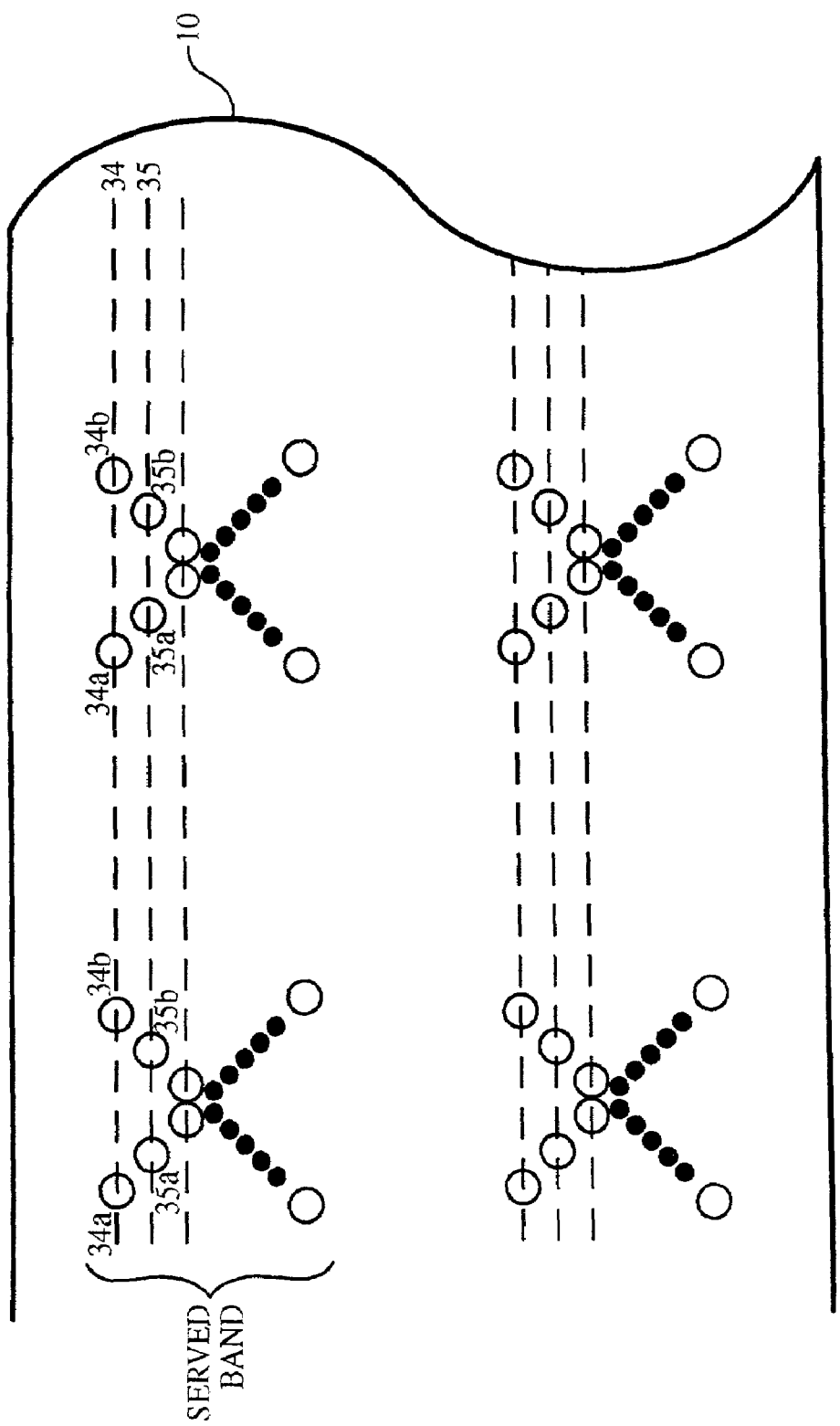
FIG. 3 is a second example of a cross pattern servo track pattern.
Figure 4:
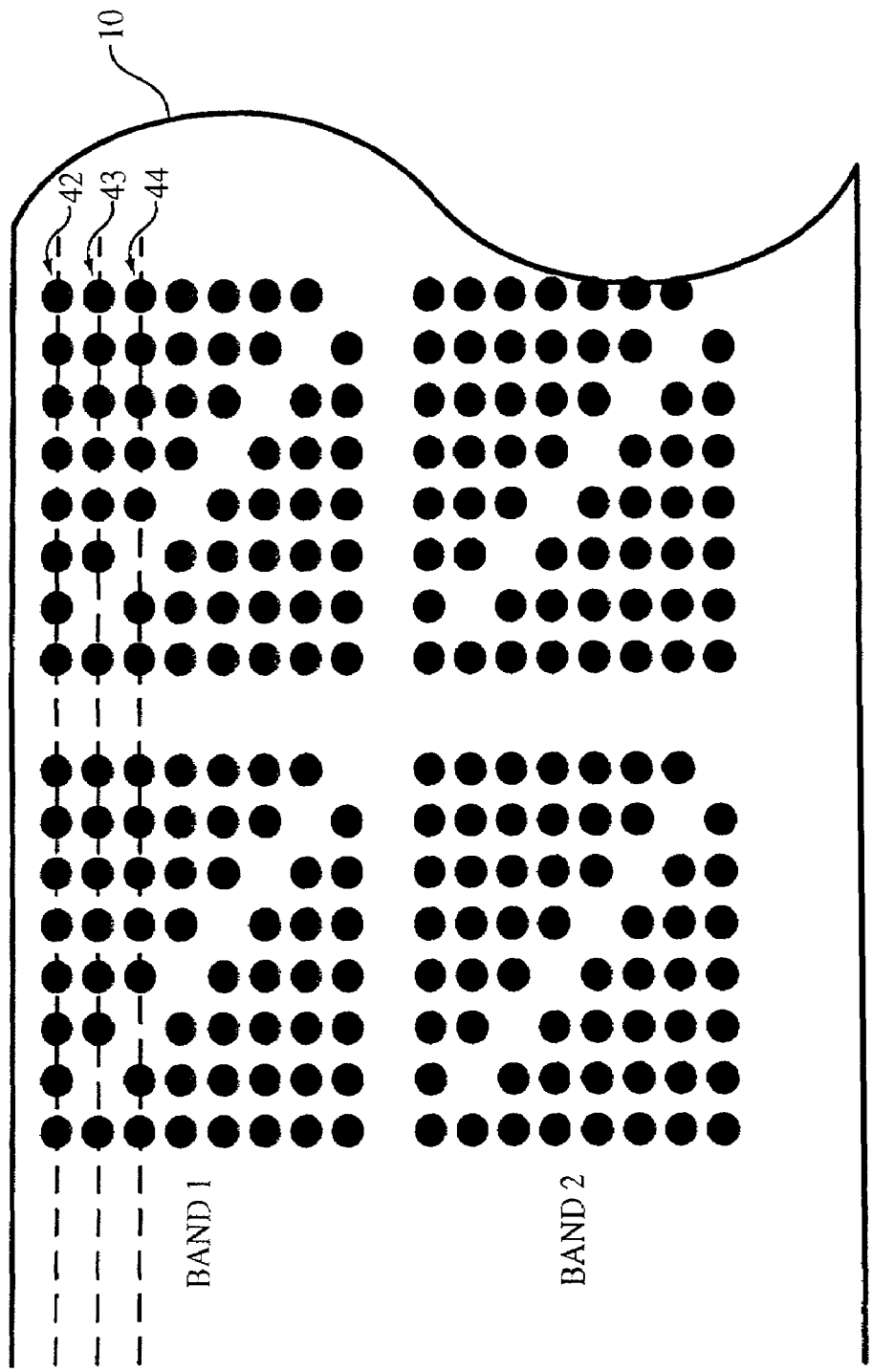
FIG. 4 is a third example of a diamond with a diamond missing servo track pattern.
Figure 5:
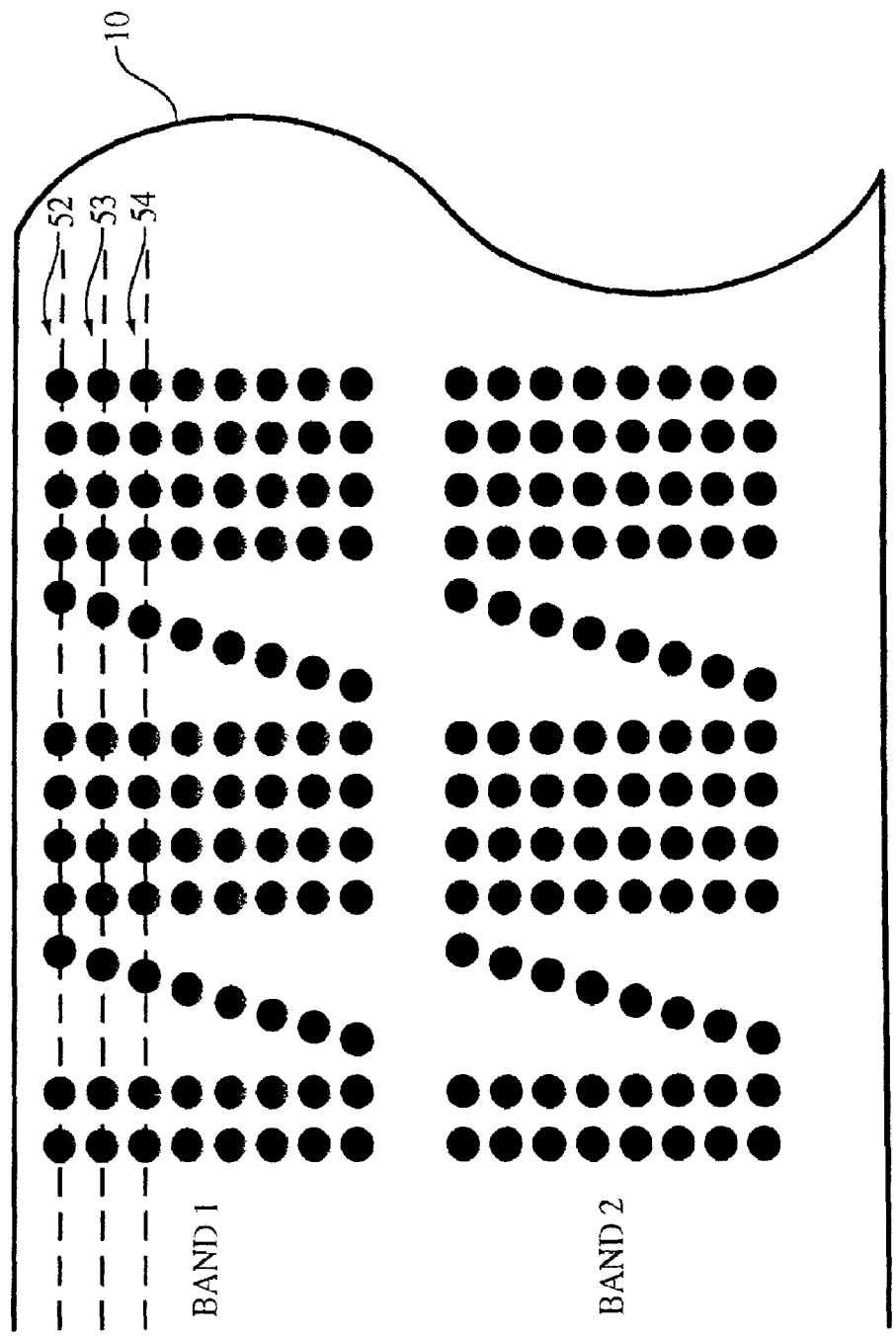
FIG. 5 is a fourth example of a servo track pattern.

Other exemplary servo track patterns are illustrated in FIGS. 3 to 5. For example, FIG. 3 shows a repetitive X-shaped track pattern with markings 34a, 34b, 35a, 35b and so forth. FIG. 4 shows a repetitive rectangular array with a missing diagonal, and with two missing columns to separate neighboring rectangles. It shows distinct tracks 42, 43, 44 and so forth. The rectangle may well be diamond shaped or other appropriate shape. FIG. 5 shows yet another repetitive pattern that allows track identification. The pattern is a missing sub-rectangle or diamond array with one or more surviving slanted lines; it shows servo tracks 52, 53, 54 and so forth.

Figure 6:
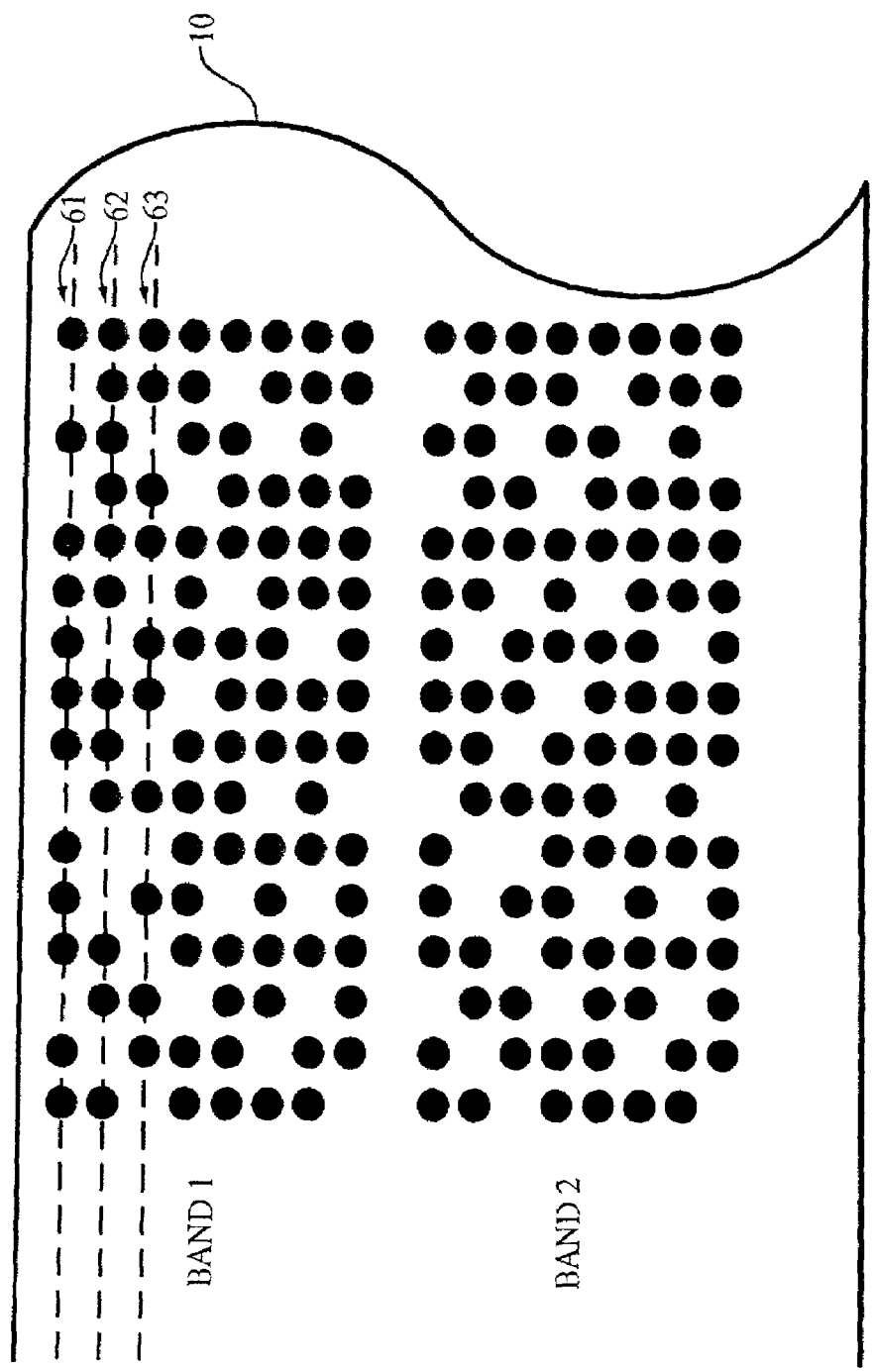
FIG. 6 is an example of a general servo pattern where each track can be individually coded.

The repetitive patterns shown above can be generated with passive optical means, that is, no real-time pattern generator. Examples are shown in FIGS. 10-14. Such repetitive patterns provide track identification, but they do not permit additional features such as longitudinal addresses, manufacturer's data and so forth. A preferred servo pattern is generated with an active pattern generator that allows each track to be individually coded. An example is shown in FIG. 6, where each track can be coded with a track address that is constant for the given track, followed by, for example, a longitudinal address that is a variable, and then by other information of value to the user, which could also be a variable. The process can be repeated along the track with a pattern generator. Example tracks are 61, 62, and 63.

Figure 7:
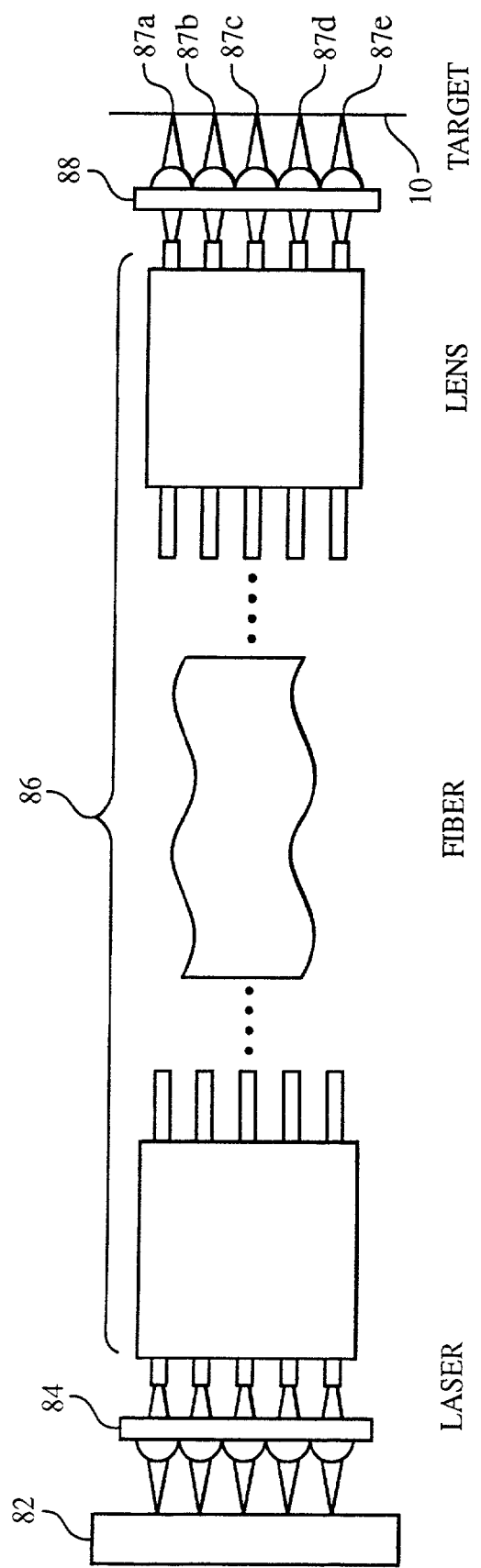
FIG. 7 is an addressable fiber-coupled laser system for writing a servo track pattern.

Referring to FIG. 7, a radiation source 82 having a plurality of individually addressable emitters, such as a semiconductor diode laser bar with ten or more emitters, provides tracks with individual coding. The emitters can be individually turned on or off at high speed. Such laser bars can emit light in the visible or IR spectral range. Each individually addressable emitter of the radiation source 82 is coupled to an optical fiber 86, for example, through an arrangement of input lenses 84. The light from each emitter is guided in a separate fiber and imaged, optionally through an arrangement of output lenses 88, onto the tape 10, to form track marks 87a, 87b, 87c, 87D, and 87e. In this example, the emitters of radiation source 82 may be arranged so as to be oriented either perpendicular, or at a slanted angle, with respect to the transport direction. This arrangement generates servo patterns illustrated in FIGS. 2 through 6.

Figure 8:
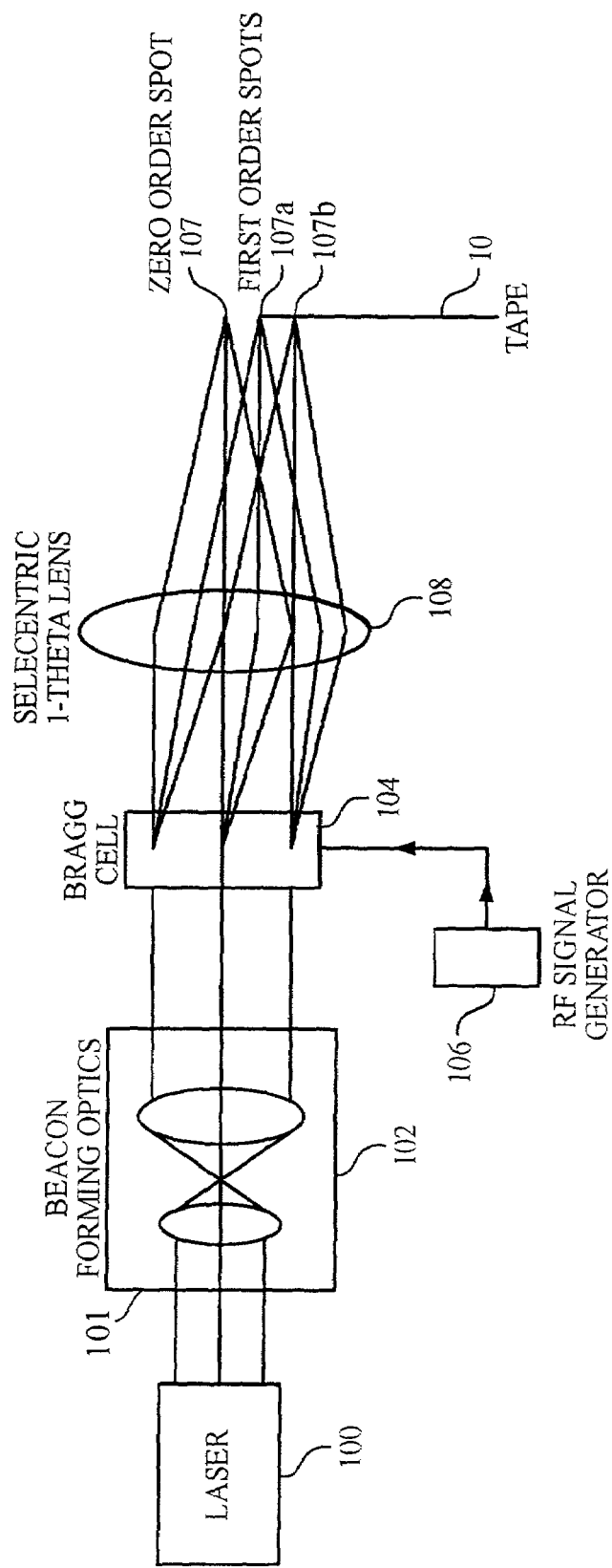
FIG. 8 is a system for writing a servo track pattern using an acousto-optic modulator.

FIG. 8 shows another arrangement to form individual servo tracks with the use of an acousto-optic device, or a Bragg cell, 104. Different spots 107, 109a, 109b on the tape 10 may be addressed and engraved with track marks using a single laser 100 and the optics system shown. The optical system may include a beam expander 102 that expands the laser beam to a suitable diameter to produce a spot with a desired spot size using a scanning lens 108. The Bragg cell 104 is actuated by a RF generator 106 that induces periodic changes in the refractive index of the Bragg cell 104 that in turn causes the laser beam to be diffracted. Changing the RF frequency can control the angle of diffraction. The scanning lens 108 then focuses the scanning beam onto the tape 10. A zero order spot is formed at the line of sight location 107, whereas a first order spot is formed at 109a and 109b, respectively on the tape 10.

The optical system of FIG. 8 can be operated to write a general servo pattern as follows. A signal generated by RF signal generator 106 having a first (higher) frequency is applied to the Bragg cell 104 to deflect the laser beam to the position 109b of FIG. 10 and write spot 29. After the tape 10 has moved in the transport direction a distance corresponding to the lengthwise separation between track marks, a second spot is written by applying to the Bragg cell 104 a signal with a second frequency which deflects the laser beam, for example, to the position 109a. Repeating the process of moving the tape 10 and changing the RF frequency of the signal write additional track marks. Due to the limited number of resolution spots, and limited scanning speed, this approach is suitable for tape drives using relatively narrow tape widths, and servo writers running at relatively low speed.

Figure 9:
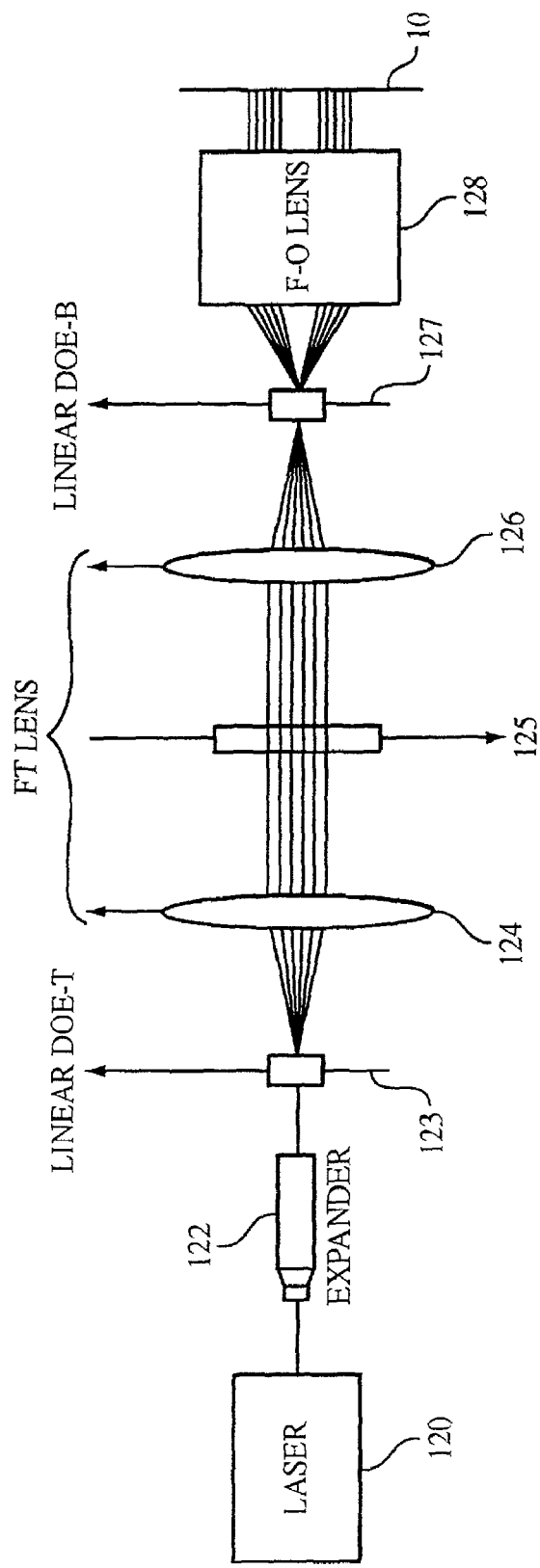
FIG. 9 is a system for writing a servo track pattern using a combination of one-dimensional DOE and one-dimensional spatial light modulator (SLM).

Referring to FIG. 9, a beam expander 122 expands a beam from the laser 120, with the expanded beam striking a diffractive optical element (DOE) 123. The DOE is designed to split an incoming beam into a linear array of multiple beams with equal angular spacing, and intensity. The DOE 123 can be positioned at a front focal plane of Fourier transform (FT) lens 124 so that the multiple diffracted light beams are Fourier-transformed at the back focal plane of the lens 124, thereby becoming equally spaced dots representing the tracks. The same pattern of equally spaced dots representing tracks enters a one-dimensional spatial light modulator (SLM) 125. The pattern that is applied to the SLM 125 is time dependent. A second FT lens 126 Fourier transforms the dot pattern into a second DOE 127 to split the multiple beam patterns further into several identical bands that are written simultaneously onto the moving tape 10. In this way, track marks having a unique track ID within one band are copied across many bands simultaneously.

The DOE is a complex optical phase pattern on an optical substrate, provided with modern micro-lithography technique. A typical substrate is the optical glass. Upon illumination with a laser beam, a desired spatial pattern can be observed in the far field or near field, depending on the design. Herein, far field DOEs are used. DOEs are sometimes called Fourier generators. An earlier name for DOE is the kinoform, and that name is still used sometimes.

The complex phase pattern is generated by mathematical computation using the laws of propagation of a coherent light beam in free space. Numerous algorithms have been developed for achieving good convergence for the mathematical computation. A mask can then be made for the complex phase pattern, from which the glass can be patterned and etched resulting in the DOE.

The DOE is distinctly different from a hologram, even though both technologies depend on the use of the laser beam. The hologram is recorded on a special recording medium by the interference of the complex phase and amplitude pattern with a reference beam. One viewpoint borrowed from communication theory is that the reference beam provides a spatial carrier and the complex pattern is the base-band modulation signal. The DOE does not use a spatial carrier, and records the base-band pattern directly. It results in the following major advantages:

1. The diffraction efficiency defined as the output beam intensity going into the desired output pattern divided by the incident laser beam approaches 90% to 100% for the DOE.
2. The hologram is an off-axis construction, while the DOE is an on-axis device. That is, the illumination beam and the desired pattern have an offset angle to each other in the case of the hologram. This causes cumbersome optical alignment compared to the DOE.
3. Since the hologram requires a carrier, the spatial resolution is very demanding. The DOE requires far less spatial resolution since only the complex signal itself has to be resolved.
4. A batch process based on micro-lithography, using a mask set and the lithography and etching tools commonly used in the semiconductor industry, fabricates the DOEs. That is, one can produce numerous parts with one batch run. The hologram has to be made one at a time, and is quite time consuming when a large number of parts are needed.

The DOE design is flexible, since the design is a mathematical construct; the hologram is not flexible since it is made from the interference of two beams onto a recording media.

The spatial light modulator 125 can be made of several candidate devices. One candidate device is made of the electro-optical crystal such as $LiNbO_3$, $LiTaO_3$, KDP, and so forth. Another candidate device is the acousto-optic modulator array made of crystals such as Tellurium Oxide ($TeO_2$), Gallium Phosphide (GaP), Gallium Arsenide (GaAs), and so forth. Yet another candidate is the liquid crystal spatial light modulator, especially high-speed ferro-electric liquid crystal varieties. In each case, a linear spatial modulator can be fabricated and electroded to turn on or turn off each element in the beam dot array.

Figure 10:
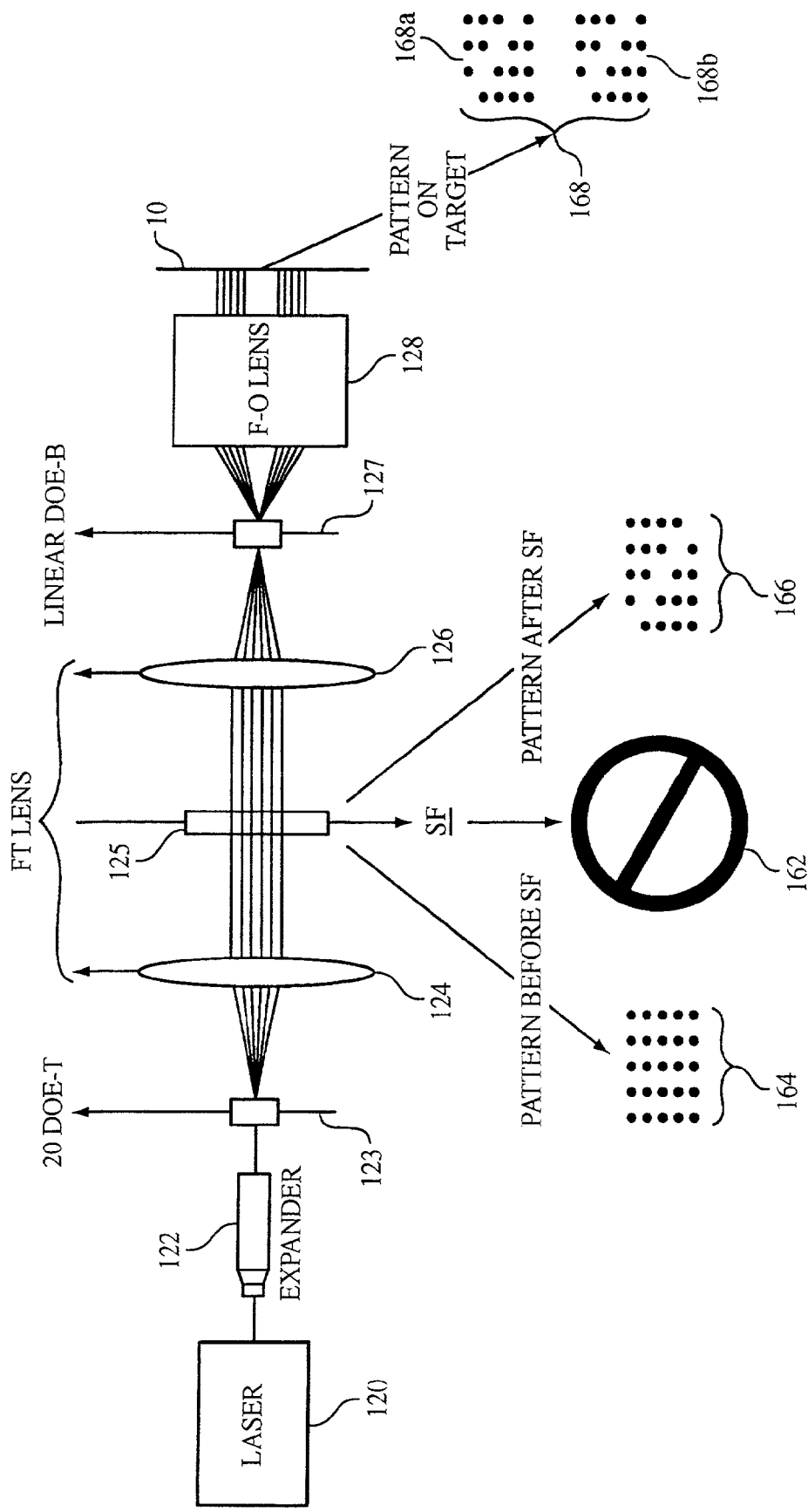
FIG. 10 is a system for writing a servo track pattern using a combination of a two-dimensional DOE and a two-dimensional spatial light modulator (SLM).

Referring to FIG. 10, an optical system is used to produce a track ID by means of a two dimensional (2D) DOE 123 in conjunction with a 2D SLM 125. The 2D SLM 125 can be an active device, or a passive spatial filter as shown in FIG. 10. An active device allows one to place any track information on each track, including track identification, manufacturer ID, manufacturer's data, longitudinal addresses, control information, and so forth. A passive device will allow only track ID to be coded in a repetitive fashion. In the example of FIG. 10, the first (2D) DOE 123 splits the expanded laser beam into a 2-dimensional array of laser beams having approximately equal intensity and a specific shape, such as the shapes 164. The spatial filter 162 blocks certain spots, such as those along a diagonal of shape 164, resulting in the pattern of 166. Each track of the pattern 166 has its own distinct track ID. A second FT lens 126 Fourier transforms the pattern 166 unto a second linear DOE 127 that duplicates or multiplies the Fourier transform of pattern 166 perpendicular to the direction of the tape motion, thereby generating multiple bands of similar tracks. A FΘ scan lens 128 images the multiple bands and the multiple tracks 168a, 168b, on the tape 10.

Figure 11:
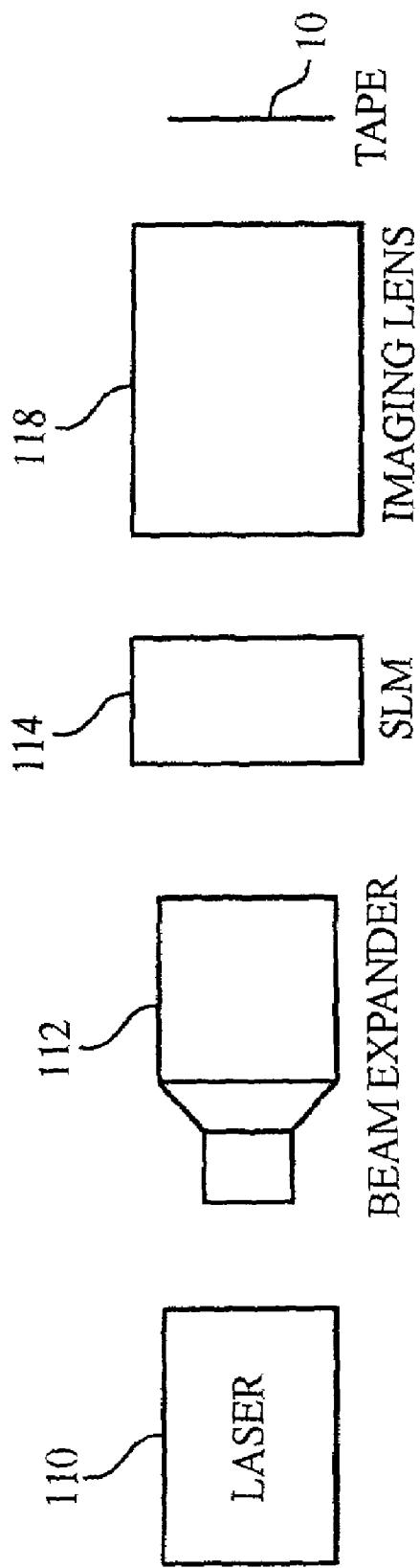
FIG. 11 is a system for writing servo track patterns using a spatial light modulator and an imaging lens.

Referring to FIG. 11, a servo pattern can be produced by first generating an image of the servo pattern on a spatial light modulator (SLM) 114. A laser beam, after being expanded by the beam expander 112, illuminates the SLM 114. An imaging lens 118 images the pattern on to the tape 10. The SLM 114 can be either one-dimensional or two-dimensional. In the case that the SLM 114 is of the reflective type rather than the transmission type as shown in FIG. 11, the system functions well if the optics is modified. Since any SLM has a fill factor for each cell in the array, it is clear that the system shown in FIG. 11 requires more laser power than those systems shown in FIG. 9 and FIG. 10.

Figure 13:
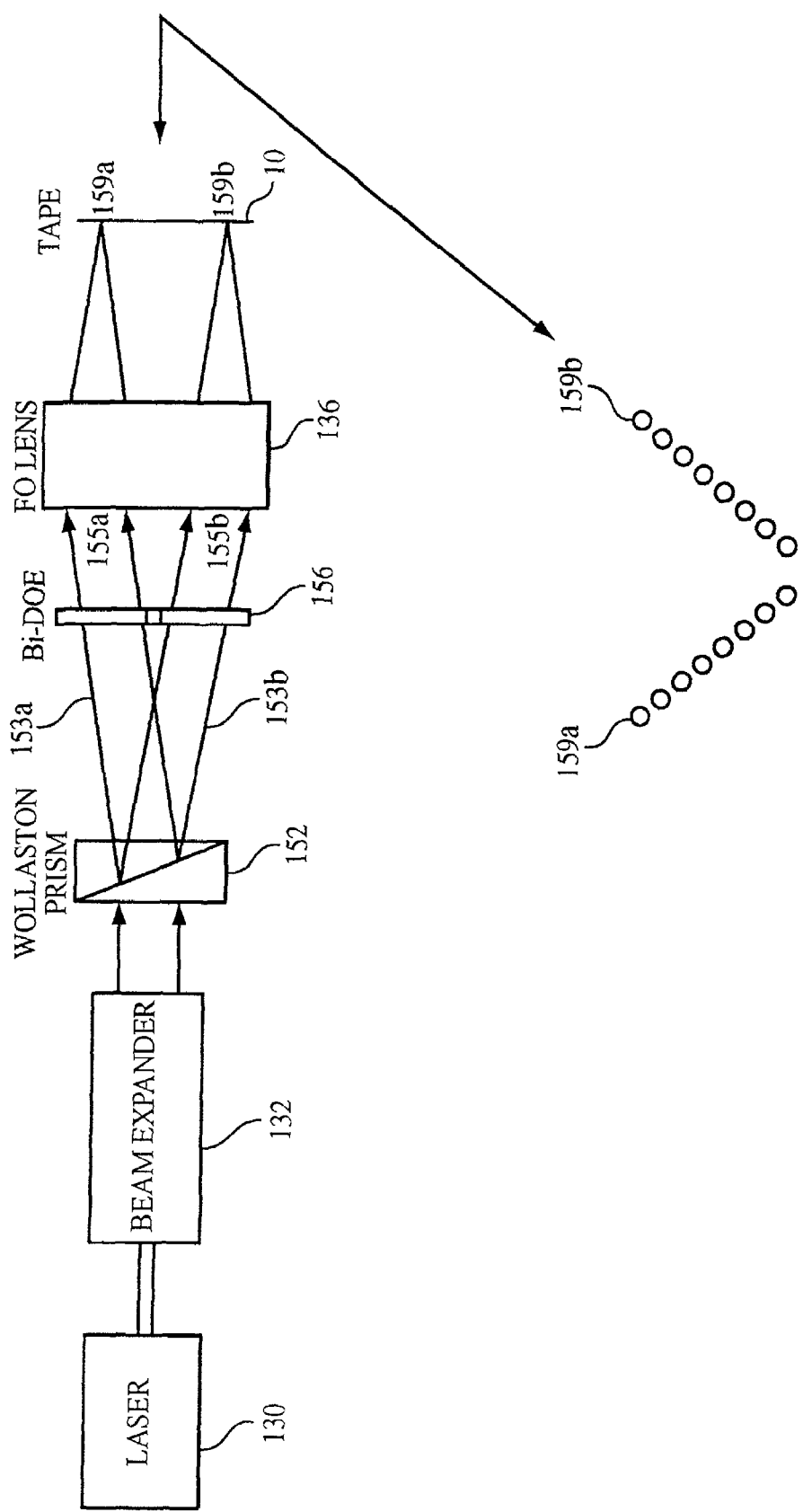
FIG. 13 is a system whereby the bi-DOE of FIG. 12 is expanded to allow the two dot patterns to be separated along the tape motion direction.
Figure 14:
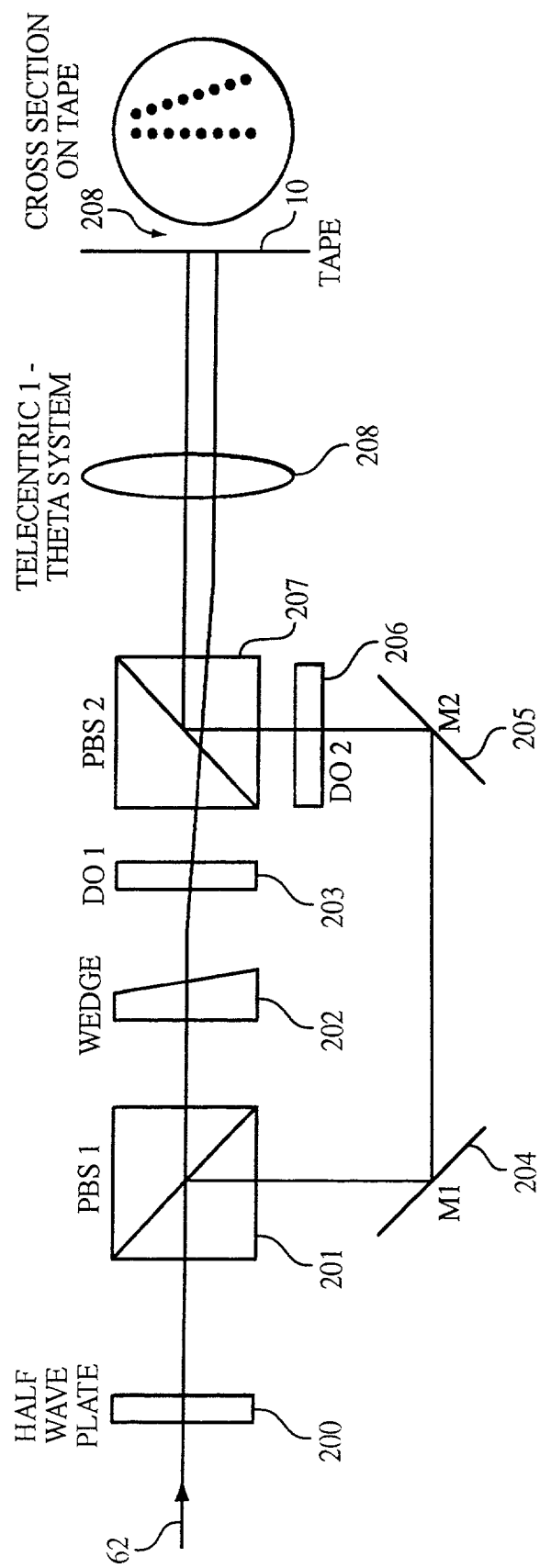
FIG. 14 is a further extension of the system of FIG. 13, whereby the bi-DOE is replaced with two separate DOEs in two separated optical paths.

FIGS. 12 through 14 illustrate a passive means of generating track identification marks.

Referring to FIG. 12A, a bi-DOE 134 is used to generate a repetitive cross pattern. A beam expander 132 expands a laser beam 130, and the expanded beam illuminates the bi-DOE 134. Each of the two DOEs in the bi-DOE 134 has a specific fringe orientation. One DOE generates a linear array of beams tilted in one direction whereas the other DOE tilts a second linear array of beams in the other direction. When the two diffracted beams are focused by a scanning lens 136 onto the tape 10, the focused spots form the cross pattern 144. Here 144a are beam dots generated by one DOE whereas 144b are beam dots generated by the other DOE in the bi-DOE 134. A cross sectional view of the bi-DOE 134 is shown in FIG. 12B. Slanted lines in 134A and 134B are representative of the orientation of the fringes inside the two DOEs.

Referring to FIG. 13, a V-like pattern is illustrated. The V pattern can be made to have no ambiguity for the identification of each track compared to the cross pattern 144 (of FIG. 12A). The expanded laser beam is split into two beams with an angle to each other, 153a and 153b, using a Wollaston prism 152, or an optical wedge. Each beam is incident on a corresponding portion of a bi-DOE 156. The fringe orientations of the two DOEs in bi-DOE 156 are similar to the ones shown in bi-DOE 134 in FIG. 12. The bi-DOE 156 generates two slanted beam arrays, 155a and 155b. The FΘ lens 136 focuses the two beam arrays into two slanted beam dot arrays separated along the tape path direction by an amount determined by the angle between the beams 153a and 153b. The result is the V shape, shown as 159a and 159b.

Referring to FIG. 14, a collimated laser beam is split into two beams. Each of the two beams goes through an individual DOE 203, 205 with the proper fringe orientation, and the two beams are combined and focused by the FΘ lens 208 into two linear arrays.

Beam 62 passes through an adjustable half wave plate 200, followed by a polarizing cube 201 to split the single beam 62 into two beams with orthogonal polarization directions, and equal power. The half wave plate 200 receives beam 62 with a given polarization state. The polarization is rotated after the beam emerges from half wave plate 200, which can be decomposed into a p-component and s-component. The polarization beam splitter 201 passes a first light beam having a first polarization direction, while reflecting the second light beam having a different orthogonal polarization direction. The first light beam passes through an optical wedge 202, a first DOE 203 and a second polarization beam splitter 207. The purpose of the optical wedge 202 to impart an angle to the beam, just like what the Wollaston prism 152 does in FIG. 13. The second light beam is reflected by two mirrors 204 and 205 before passing through the second DOE 206 and then reflected by the second polarization beam splitter 207. The two light beams exiting the second polarization beam splitter 207 are offset with respect to one another in the direction of the tape motion indicated by arrow 28. The offset can be adjusted by selecting an appropriate wedge angle of the wedge 202. The relative angle between the two linear array dots in the track pattern is designed into the two DOE's 201 and 206 via respective fringe orientation and fringe spacing control. The two beam patterns are focused by the FΘ lens 208 to form a track pattern on the moving tape 10.

Figure 15:
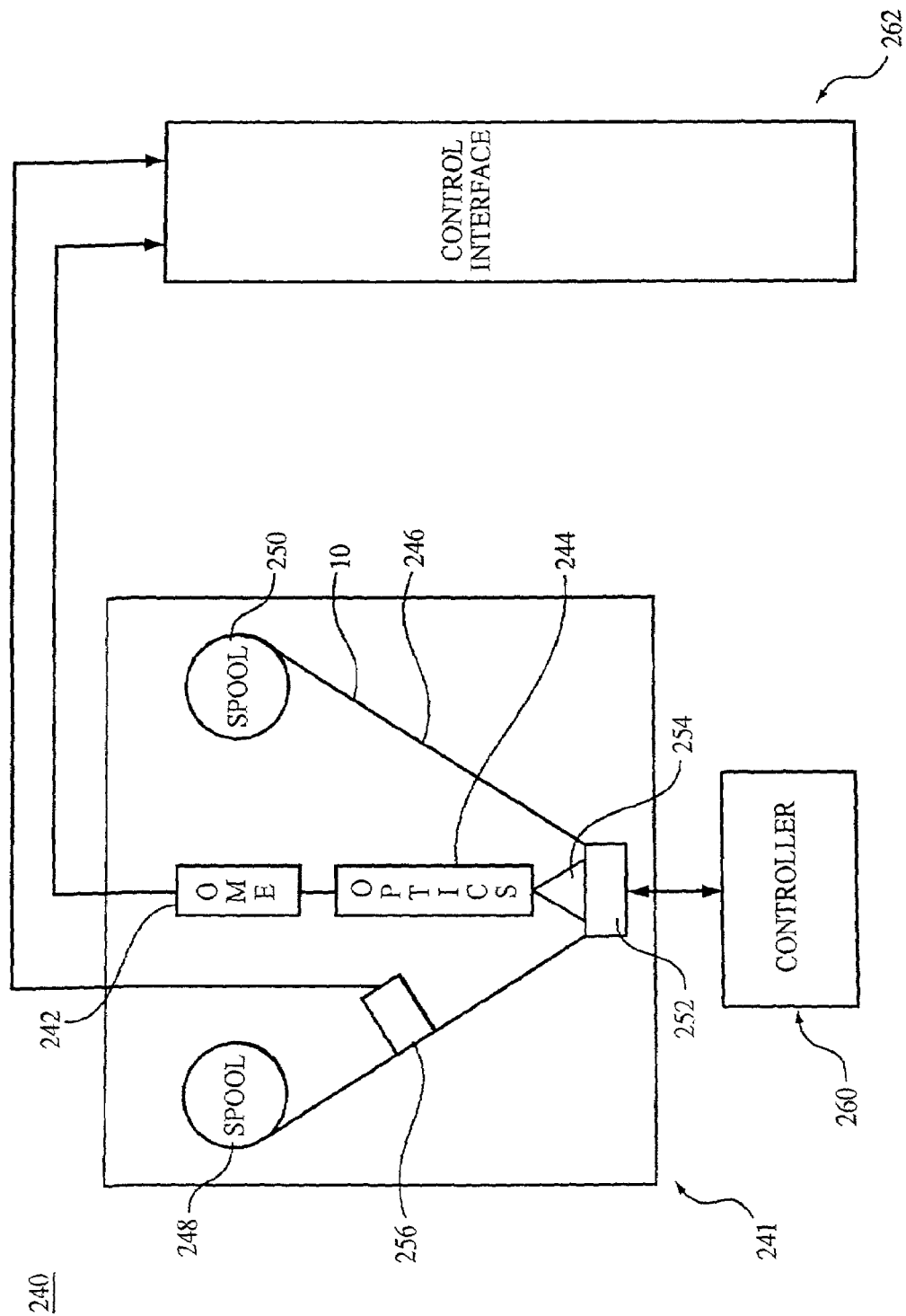
FIG. 15 is a block diagram of an exemplary system for manufacturing a tape that has servo tracks thereon.

FIG. 15 shows a block diagram of an exemplary system 240 for forming servos tracks and servo marks on the magnetic tape 10. The system 240 includes an optical marking system 241 to mark a servo track onto a surface of the magnetic tape 10. The marking unit 241 includes an optical marking engine (OME) 242 with a light source, such as a laser, marking optics 244, as well as a tape transport path 246. The tape transport path 246 is defined by two spools, 248 and 250, and tape stabilizer 252, which minimizes tape movement, in particular lateral tape motion (LTM), at the beam marking area 244 defined by a multiplicity of beams formed by the marking optics 244. The beam marking area is depicted schematically as a triangle 254. The optical marking engine 242 and marking optics 244 can incorporate any of the examples for writing a servo pattern described with reference to FIGS. 7–15 above.

A verifier 256 is located downstream from the beam marking area 244, and carries out the function of direct read-after-write, thus verifying that marks engraved onto the tape surface are appropriately written. Controller 260 may be a computer that may include software for controlling the tape transport, the optical marking engine 242, and the verifier 256, some or all of which can be mediated via a control interface 262. One feature of the depicted verifier 256 is that the direct read after write signals can be conditioned and processed via a digital signal processor (not shown) that can be incorporated in the controller 260, to establish pass/fail criteria for various features of interest. Thus the optical marking system 241 either can be de-activated under the most severe offense for which correction while operation is not feasible or, for a milder offense that can be corrected while in operation, a failed portion of the tape 10 can be identified and its location recorded in the controller 260. The failed portion of the tape 10 can then be discarded in a subsequent process.

A number of embodiments of the invention have been described. Other embodiments are within the scope of the following claims.

What is claimed is:

1. An optical servo writer system comprising:
a laser source for generating a single beam of light;
a diffractive optical element (DOE) positioned to receive and split the single beam into a linear array of beams;
a lens to focus the linear array of beams to form a spatially separated array of beam dots; and
a spatial light modular (SLM) positioned to receive and selectively filter the linear array of beam dots to form a time dependent spatial pattern.

2. The system of claim 1 further comprising lenses positioned to image the filtered beam dots onto a moving magnetic tape to cause a time dependent etched pattern on the tape, each one of the dots corresponding to one of a plurality of servo tracks.

3. The system of claim 2 in which a second DOE is positioned prior to a final focusing lens so that the tracks are simultaneously duplicated into multiple copies across a width of the moving tape.

4. The system of claim 2 in which the filtered beam dots form and etch a pattern on a non-magnetic surface of the moving magnetic tape.

5. The system of claim 2 in which the filtered beam dots form and etch a pattern on a magnetic surface of the moving magnetic tape.

6. The system of claim 2 in which the pattern indicates track identification, a position along the tape, manufacturer's data, and control information for each of the plurality of servo tracks on the magnetic tape.

7. A method of generating a pattern on a magnetic tape comprising:
generating a single beam of coherent light;
splitting the single beam into a diffractive optical element (DOE) into a linear array of beams;
focusing the beams to form an array of spatially separated beam dots, and filtering the plurality of beam dots in a spatial light modular (SLM).

8. The method of claim 7 further comprising positioning lenses to image the filtered beam dots on a moving magnetic recording tape, the dots forming a time dependent etched pattern on the tape.

9. The method of claim 8 further comprising etching the filtered beam dots on a non-magnetic surface of the moving recording tape.

10. The method of claim 8 further comprising etching the filtered beam dots on a magnetic surface of the moving magnetic recording tape.

11. The method of claim 8 in which the pattern indicates track identification, position along the tape, control information, and manufacturer's data for each of the plurality of servo tracks on the magnetic recording tape.

12. An optical servo writer system comprising:
a laser for generating a single beam of light;
a diffractive optical element (DOE) positioned to receive and split the single beam into a two dimensional array of beams;
a lens to focus the two dimensional array of beams to form a two dimensional array of spatially separated beam dots; and
a spatial light modular (SLM) positioned to receive and selectively filter the two-dimensional array of beam dots.

13. The system of claim 12 further comprising lenses positioned to image the selectively filtered beam dots onto a moving magnetic tape, the dots forming a time dependent etched pattern on the tape.

14. The system of claim 13 in which a second DOE is positioned prior to a final focusing lens such that tracks are duplicated into multiple copies across a width of the moving magnetic tape.

15. The system of claim 13 in which the SLM is an active spatial modulator in which each individual cell of the modulator in which each individual cell of the SLM can be selectively turned on and off to allow passage or blockage of light.

16. The system of claim 13 in which the SLM is a passive spatial filter in which filtered pattern is a pre-determined fixed spatial pattern.

17. The system of claim 13 in which the selectively filtered beam dots form and etch the pattern on a non-magnetic surface of the magnetic tape.

18. The system of claim 13 in which the selectively filtered beam dots form and etch the pattern on a magnetic surface of the magnetic tape.

19. The system of claim 13 in which the pattern indicates track identification, position along the tape, control information, and manufactuer's data for each of a plurality of data tracks on a recording surface of the magnetic tape.

20. A method of generating a pattern on a magnetic tape comprising:
generating a single beam of coherent light;
splitting the single beam in a diffractive optical element (DOE) into a two dimensional array of beams;
focusing the two dimensional array of beams by a lens to from a two dimensional array of spatially separated beam dots; and
spatially filtering the plurality of beam dots with a spatial light modulator (SLM).

21. The method of claim 20 further comprising positioning lenses to image the spatially filtered beam dots on a moving magnetic tape.

22. The method of claim 21 in which a second DOE is positioned prior to a final focusing lens such that tracks are duplicated into multiple copies across a width of the moving tape.

23. The method of claim 21 in which the spatially filtered beam dots form and etch a pattern on a non-magnetic surface of the magnetic tape.

24. The method of claim 20 in which the spatially filtered beam dots form and etch a pattern on a magnetic surface of the magnetic tape.

25. A system comprising:
a laser source for generating a single beam of light;
a passive optical element to split the beam into two beams with an angle separation; and
bi-diffractive optical element (bi-DOE) having two diffractive optical elements (DOEs), each DOE having different angle orientations for a diffracted array of beams.

26. The system of claim 25 further comprising:
a lens positioned to receive and focus the two beams to generate a pattern having two linear arrays of dots forming a small angle with respect to each other on a moving magnetic tape.

27. The system of claim 26 in which a third DOE is positioned prior to a final focusing lens such that tracks are duplicated into multiple copies across a width of the moving tape.

28. The system of claim 26 in which the two beams form and etch a pattern on a non-magnetic surface of the magnetic tape.

29. The system of claim 26 in which the two beams form and etch a pattern on a magnetic surface of the magnetic tape.

30. The system of claim 26 in which the pattern indicates track identification for each of a plurality of servo tracks on the magnetic tape.

31. The system of claim 25 where the passive optical element is a Wollaston prism.

32. The system of claim 25 where the passive optical element is an optical wedge.

33. The system of claim 25 in which the two DOEs are one-dimensional, each producing a one-dimensional array of beams.

34. The system of claim 25 wherein the two DOEs are etched into a single glass substrate.

35. A system comprising:
a laser source for generating a single beam of light;
a half-wave-plate in combination with a polarizing beam splitter positioned to receive and split the single beam into two beams;
an optical wedge positioned in a first beam to impart a small angle deviation to one of the two beams;
a set of mirrors to direct a second beam such that the two beams can be recombined;
a first diffracitve optical element (DOE) positioned to split the second beam into a second linear array of beams; and
a second polarizing beam splitter positioned to receive and recombine the first and second array of beams.

36. The system of claim 35 further comprising:
a lens positioned to receive and focus the recombined array of beams to generate a repeated pattern having two linear array of dots forming an angle with respect to each other on a moving magnetic tape.

37. The system of claim 36 further comprising a third DOE positioned prior to a final focusing lens such that tracks are duplicated into multiple copies across the moving tape.

38. The system of claim 36 in which the first beams and the second beams form and etch a pattern on a non-magnetic surface of the magnetic tape.

39. The system of claim 36 in which the first beams and the second beams form and etch a pattern on a magnetic surface of the magnetic tape.

40. The system of claim 36 in which the pattern indicates track identification for each of a plurality of servo tracks on the magnetic tape.

* * * * *